US008662515B2

(12) United States Patent
Tsai

(10) Patent No.: US 8,662,515 B2

(45) Date of Patent: Mar. 4, 2014

(54) MOVABLE WHEELCHAIR STRUCTURE

(76) Inventor: Chin-Hsing Tsai, Changhua (TW)

( * ) Notice: Subject to any disclaimer, the term of this patent is extended or adjusted under 35 U.S.C. 154(b) by 367 days.

(21) Appl. No.: 13/029,268

(22) Filed: Feb. 17, 2011

(65) Prior Publication Data

US 2012/0211952 A1 Aug. 23, 2012

(51) Int. Cl.
*B62M 1/14* (2006.01)

(52) U.S. Cl.
USPC .................... 280/250.1; 280/647; 5/81.1 HS

(58) Field of Classification Search
USPC ............... 280/250.1, 304.1, 647, 648; 5/86.1, 5/81.1 HS
See application file for complete search history.

(56) References Cited

U.S. PATENT DOCUMENTS

| | | | | |
|---|---|---|---|---|
| 1,748,784 | A * | 2/1930 | Mierley | 297/90 |
| 2,587,068 | A * | 2/1952 | Sanders | 5/86.1 |
| 4,278,387 | A * | 7/1981 | Seguela et al. | 414/462 |
| 4,422,660 | A * | 12/1983 | Costello et al. | 280/250.1 |
| 4,477,117 | A * | 10/1984 | Higgs | 297/45 |
| 5,193,633 | A * | 3/1993 | Ezenwa | 180/65.1 |
| 5,674,041 | A * | 10/1997 | Smith et al. | 414/345 |
| 5,884,929 | A * | 3/1999 | Kincaid | 280/304.1 |
| 6,325,399 | B1 * | 12/2001 | DeMoss | 280/250.1 |
| 6,454,286 | B1 * | 9/2002 | Hosino | 280/250.1 |
| 6,802,518 | B2 * | 10/2004 | Kuntz | 280/250.1 |
| 6,846,042 | B2 * | 1/2005 | Hanson et al. | 297/411.36 |
| 6,866,288 | B2 * | 3/2005 | Martin | 280/647 |
| 7,537,237 | B2 * | 5/2009 | Chung et al. | 280/647 |
| 7,661,696 | B1 * | 2/2010 | Acebo | 280/647 |
| 7,752,687 | B1 * | 7/2010 | Denosky | 5/81.1 HS |
| 8,316,480 | B2 * | 11/2012 | Burak et al. | 5/87.1 |
| 8,398,108 | B2 * | 3/2013 | Andrews | 280/304.1 |
| 2009/0158523 | A1 * | 6/2009 | Burak et al. | 5/87.1 |
| 2009/0218784 | A1 * | 9/2009 | Porcheron | 280/250.1 |
| 2010/0154116 | A1 * | 6/2010 | Fan | 5/86.1 |

FOREIGN PATENT DOCUMENTS

TW 201231032 * 8/2012

* cited by examiner

*Primary Examiner* — Katy M Ebner
*Assistant Examiner* — Emma K Frick
(74) *Attorney, Agent, or Firm* — Alan Kamrath; Kamrath IP Lawfirm, P.A.

(57) ABSTRACT

A movable wheelchair structure contains a base. A sliding mechanism is fixed on the base and includes two rods extending outward from one side of the base, with each rod including an auxiliary wheel extending outward from one end portion thereof. A vertical moving mechanism is fixed on the sliding mechanism. A frame is fixed on one side of the vertical moving mechanism and moves vertically and horizontally with the vertical moving mechanism and the sliding mechanism. A back support axially is coupled with a rear end of the frame. A leg member is axially connected with a front end of the frame. Thus, a user is capable of moving onto a bed or another position, enhancing usage at a hospital and at home.

8 Claims, 14 Drawing Sheets

MOVABLE WHEELCHAIR STRUCTURE

BACKGROUND OF THE INVENTION

1. Field of the Invention

The present invention relates to a wheelchair structure and, more particularly, to a movable wheelchair structure capable of moving vertically and horizontally so that a user moves onto the bed or another position.

2. Description of the Prior Art

People who have a body and mind barrier and the elderly move by using a wheelchair. When they have to move from the wheelchair to another position (such as a bed or a bath chair) and since a height of the cushion of the wheelchair is not equal to that of another position, a movement difficulty will occur. Besides, such a movement difficulty will cause damage to their bodies.

To solve such a problem, auxiliary equipment, such as a shifting machine, is developed. However, these auxiliary equipment is expensive and occupies space, and when moving a user, a hanging loop and a positioning strap have to be fixed on the user, operating inconveniently and time consumingly.

The present invention has arisen to mitigate and/or obviate the afore-described disadvantages.

SUMMARY OF THE INVENTION

The primary objective of the present invention is to provide a movable wheelchair structure capable of adjusting a leaning angle of a back support and a leg member. The frame, the back support, and the leg member move vertically and horizontally with the vertical moving mechanism and the sliding mechanism so that a user moves onto the bed or another position, enhancing usage at a hospital and at home.

To obtain the above objective, a movable wheelchair structure provided by the present invention contains:

a base;

a sliding mechanism fixed on the base and including two rods extending outward from one side of the base, with each rod including an auxiliary wheel extending outward from one end portion thereof;

a vertical moving mechanism fixed on the sliding mechanism;

a frame fixed on one side of the vertical moving mechanism and moving vertically and horizontally with the vertical moving mechanism and the sliding mechanism;

a back support axially coupled with a rear end of the frame; and a leg member axially connected with a front end of the frame.

DETAILED DESCRIPTION OF THE PREFERRED EMBODIMENTS

The present invention will be clearer from the following description when viewed together with the accompanying drawings, which show, for purpose of illustration only, the preferred embodiments in accordance with the present invention.

Figure 1:
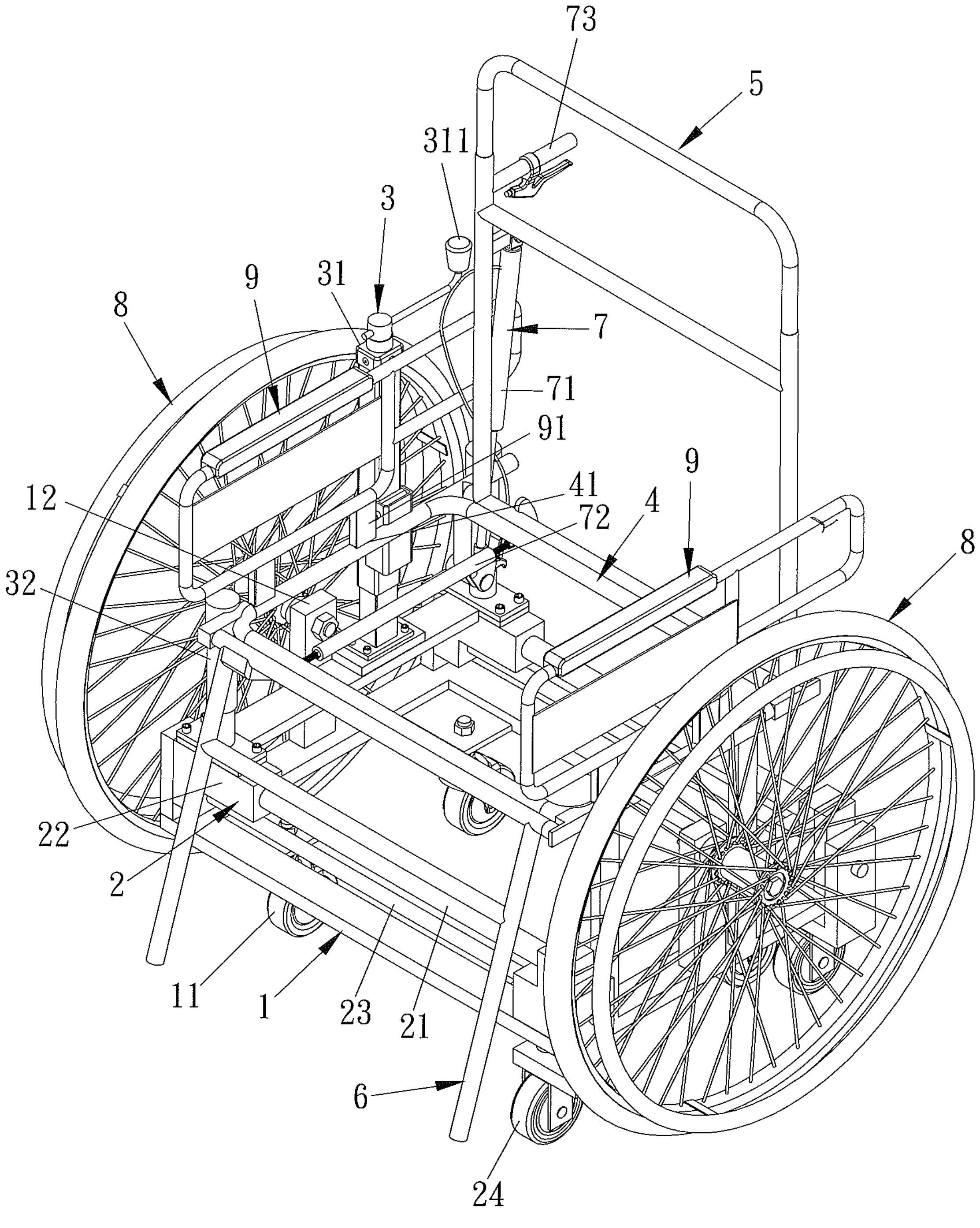
FIG. 1 is a perspective view showing the assembly of a movable wheelchair structure according to a preferred embodiment of the present invention.
Figure 2:
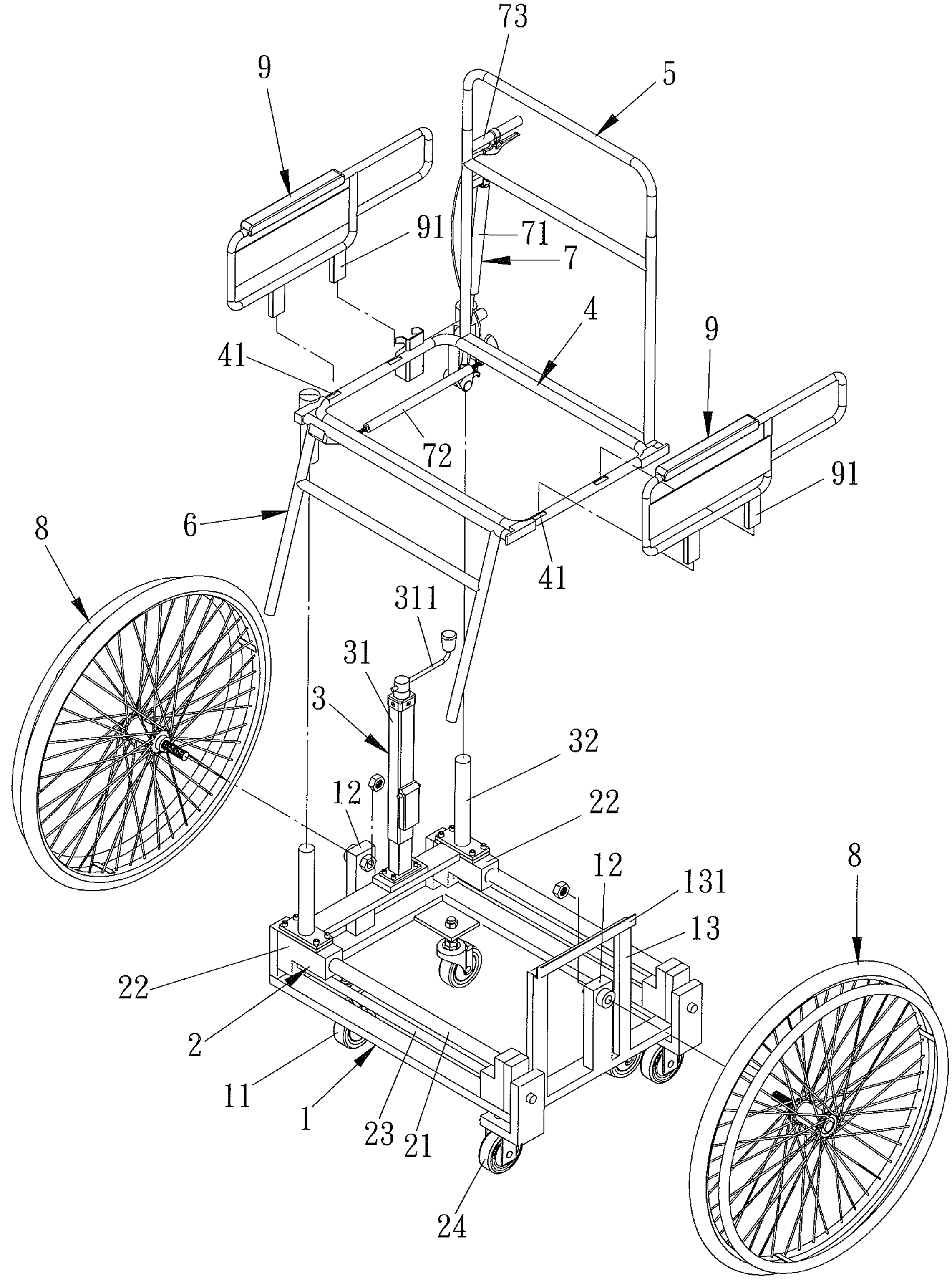
FIG. 2 is a perspective view showing the exploded components of the movable wheelchair structure according to the preferred embodiment of the present invention.

With reference to FIGS. 1-2, a movable wheelchair structure according to a preferred embodiment of the present invention comprises a base 1, a sliding mechanism 2, a vertical moving mechanism 3, a frame 4, a back support 5, a leg member 6, an angle adjusting mechanism 7, two driving wheels 8, and two armrests 9. The base 1 includes four rollers 11 disposed on a bottom end thereof, Two positioning posts 12 extend upward from two sides thereof respectively. A supporting rack 13 is fixed on one of the two sides thereof and has a stop portion 131 secured on a top end of the supporting rack 13. The sliding mechanism 2 is fixed on the base 1 and includes two slidable rails 21 arranged on front and rear ends thereof individually. Each slidable rail 21 includes a movable seat 22 formed thereon. The movable seat 22 includes a rod 23 extending outward from one side thereof. The rod 23 includes an auxiliary wheel 24 extending outward from one end portion thereof to movably extend out of one side of the base 1 with the movable seat 22 and to be supported by the auxiliary wheel 24. The vertical moving mechanism 3 is fixed on the sliding mechanism 2 and includes a pillar 31 to move vertically and two auxiliary telescopic tubes 32. The pillar 31 is defined between two movable seats 22 of the sliding mechanism 2 and includes a swing bar 311 disposed on a top end thereof to be manually operated to further move upward and downward. The two auxiliary telescopic tubes 32 are fixed on two top surfaces of the two movable seats 22 of the sliding mechanism 2 respectively. One side of the frame 4 is connected with the vertical moving mechanism 3 in a retaining and fitting manner to move vertically and horizontally with the vertical moving mechanism 3 and the sliding mechanism 2, and another side of the frame 4 is fixed on the stop portion 131 of the supporting rack 13 of the base 1, obtaining a support and positioning effect so that the frame 4 is fixed securely. The frame 4 further includes two holes 41 formed on each of two sides thereof. The back support 5 is axially coupled with a rear end of the frame 4. The leg member 6 is axially connected with a front end of the frame 4. The angle adjusting mechanism 7 includes an expanding and retracting device 71, a connecting stem 72, and a controller 73. The expanding and retracting device 71 is defined between the frame 4 and the back support 5 to adjust a leaning angle of the back support 5. The connecting stem 72 is defined between the back support 5 and the leg member 6 so that the leg member 6 is actuated to move by the back support 5 which is adjusted to lean at an angle. The controller 73 is fixed between the frame 4 and the back support 5 to control the expanding and retracting device 71 to move. The two driving wheels 8 are positioned between the two positioning posts 12 of the two sides of the base 1. Each of the two armrests 9 includes two insertions 91 extending downward from a bottom end thereof to be inserted into the holes 41 of the frame 4 by using the insertions 91.

Figure 3:
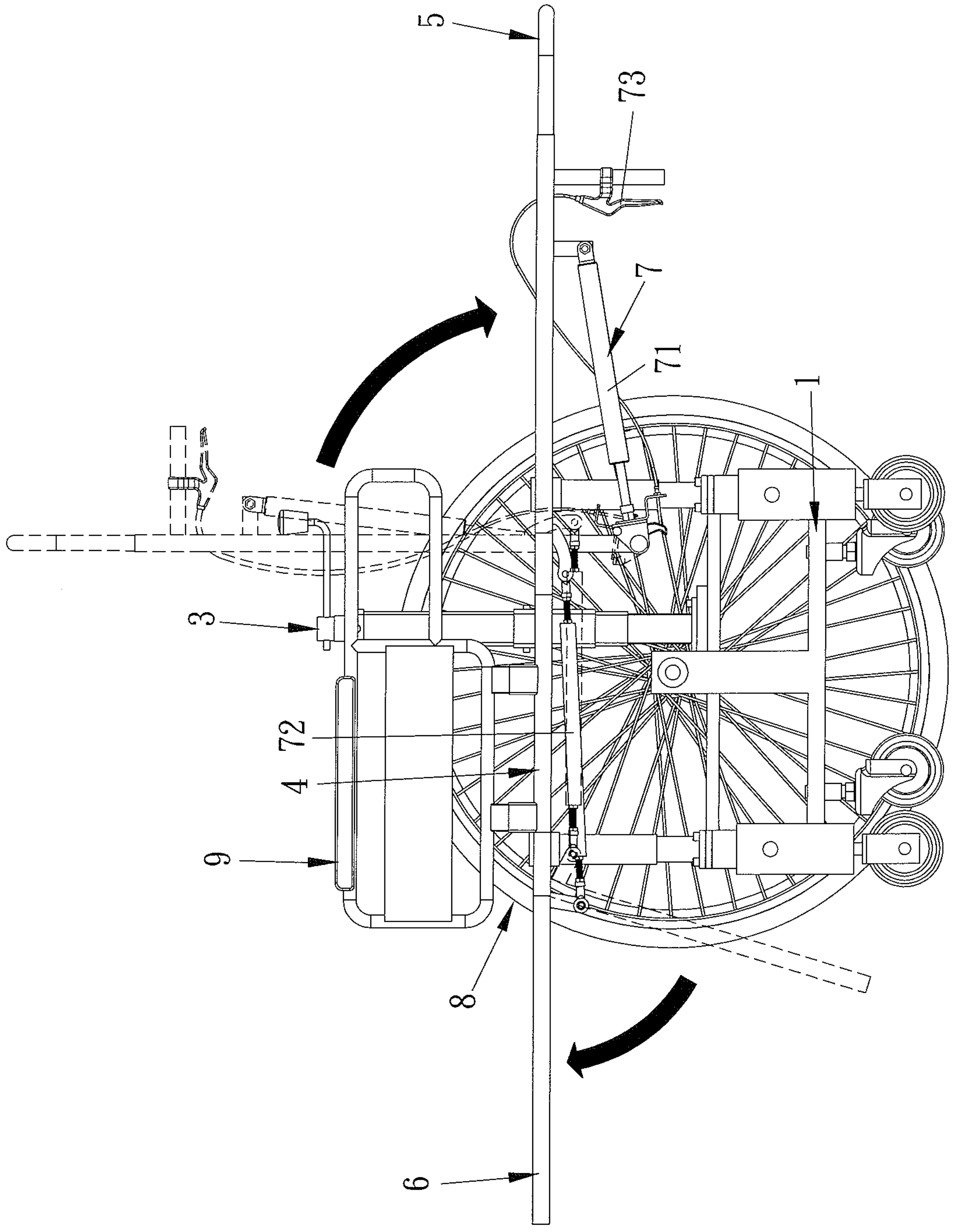
FIG. 3 is a plan view showing the movable wheelchair structure adjusted to generate a leaning angle according to the preferred embodiment of the present invention.

As shown in FIG. 3, in operation, the controller 73 releases the expanding and retracting device 71 to adjust the leaning angle of the back support 5. Then the connecting stem 72 actuates the leg member 6 to adjust the back support 5, the leg member 6, and the frame 4 so that a bed plane type or a wheelchair type at a proper angle is formed among the back support 5, the leg member 6, and the frame 4.

Figure 4:
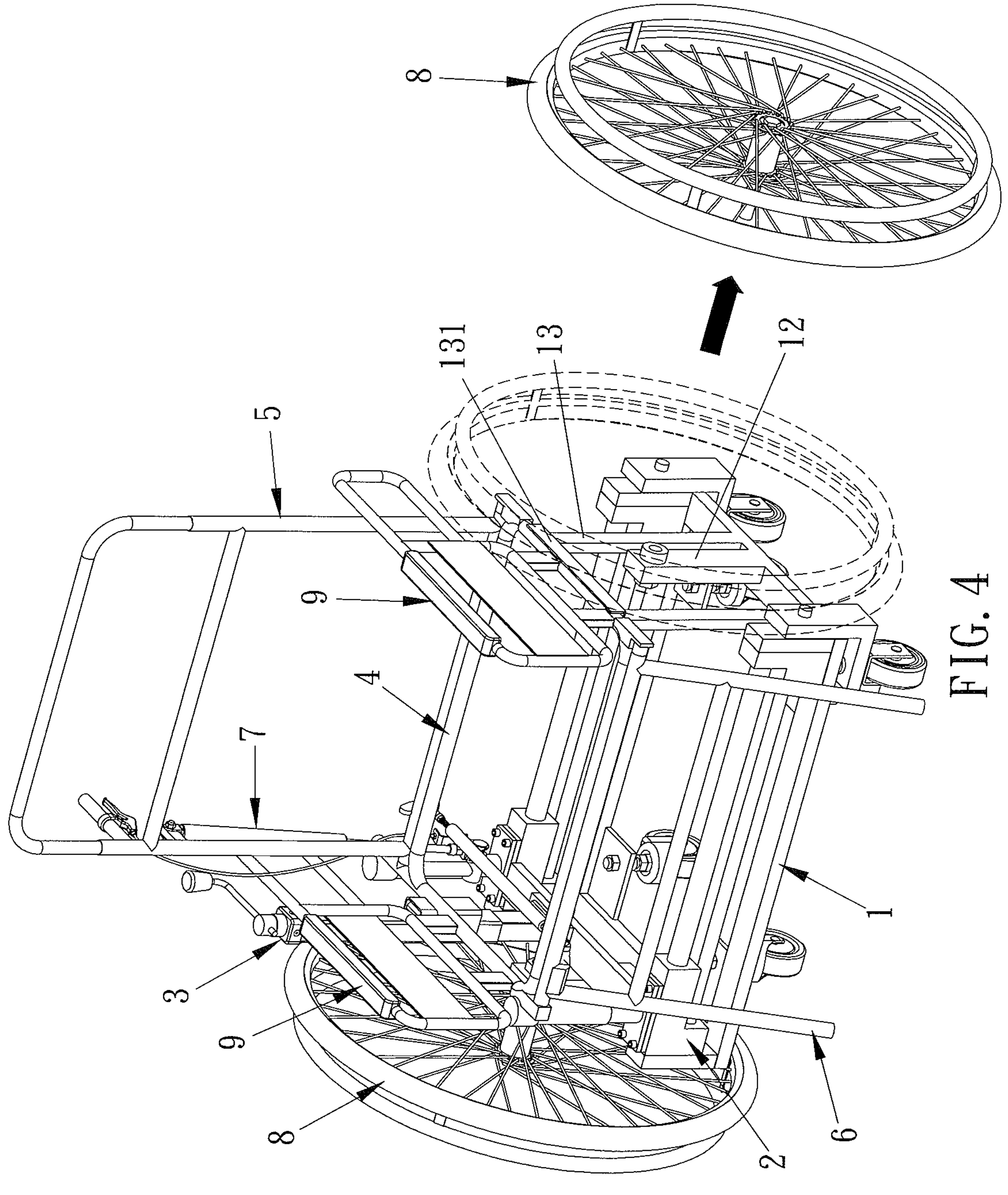
FIG. 4 is a perspective view showing a driving wheel removed from one side of a base in a wheelchair type according to the preferred embodiment of the present invention.
Figure 5:
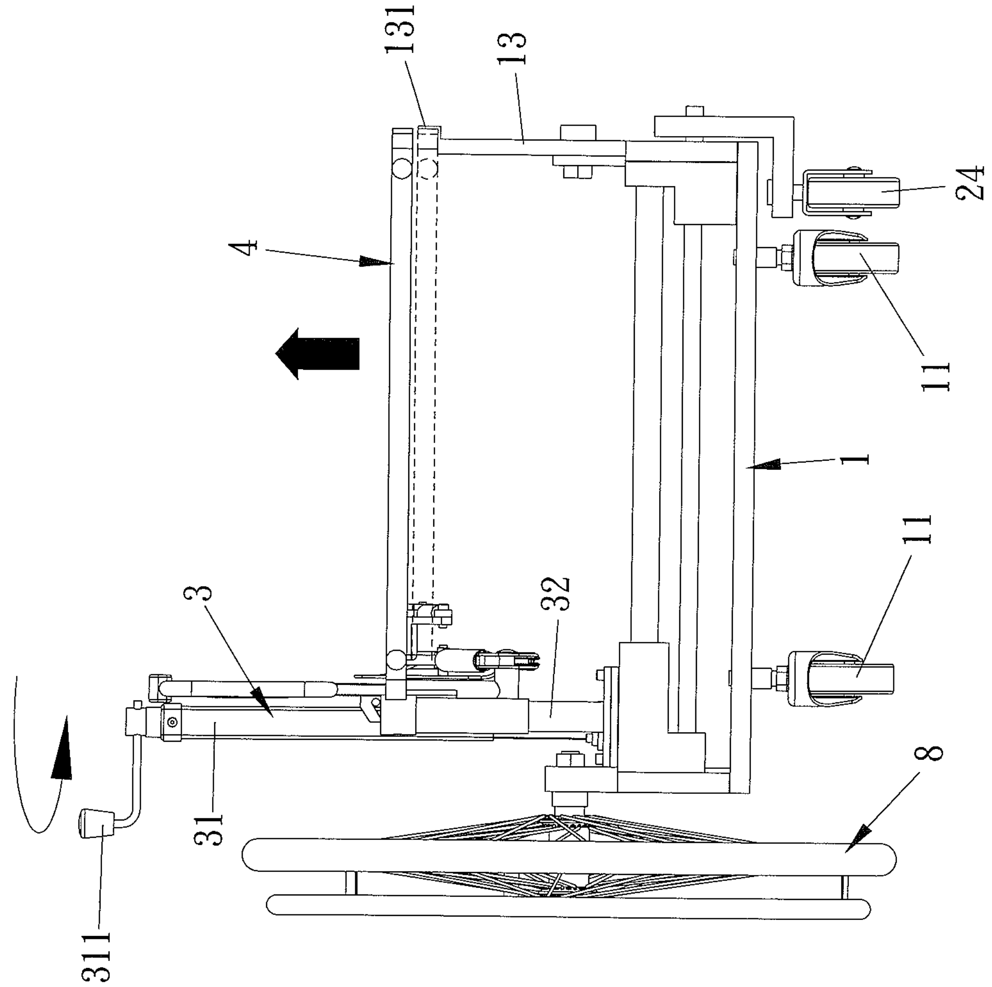
FIG. 5 is a plan view showing the movable wheelchair structure raised in the wheelchair type according to the preferred embodiment of the present invention.
Figure 6:
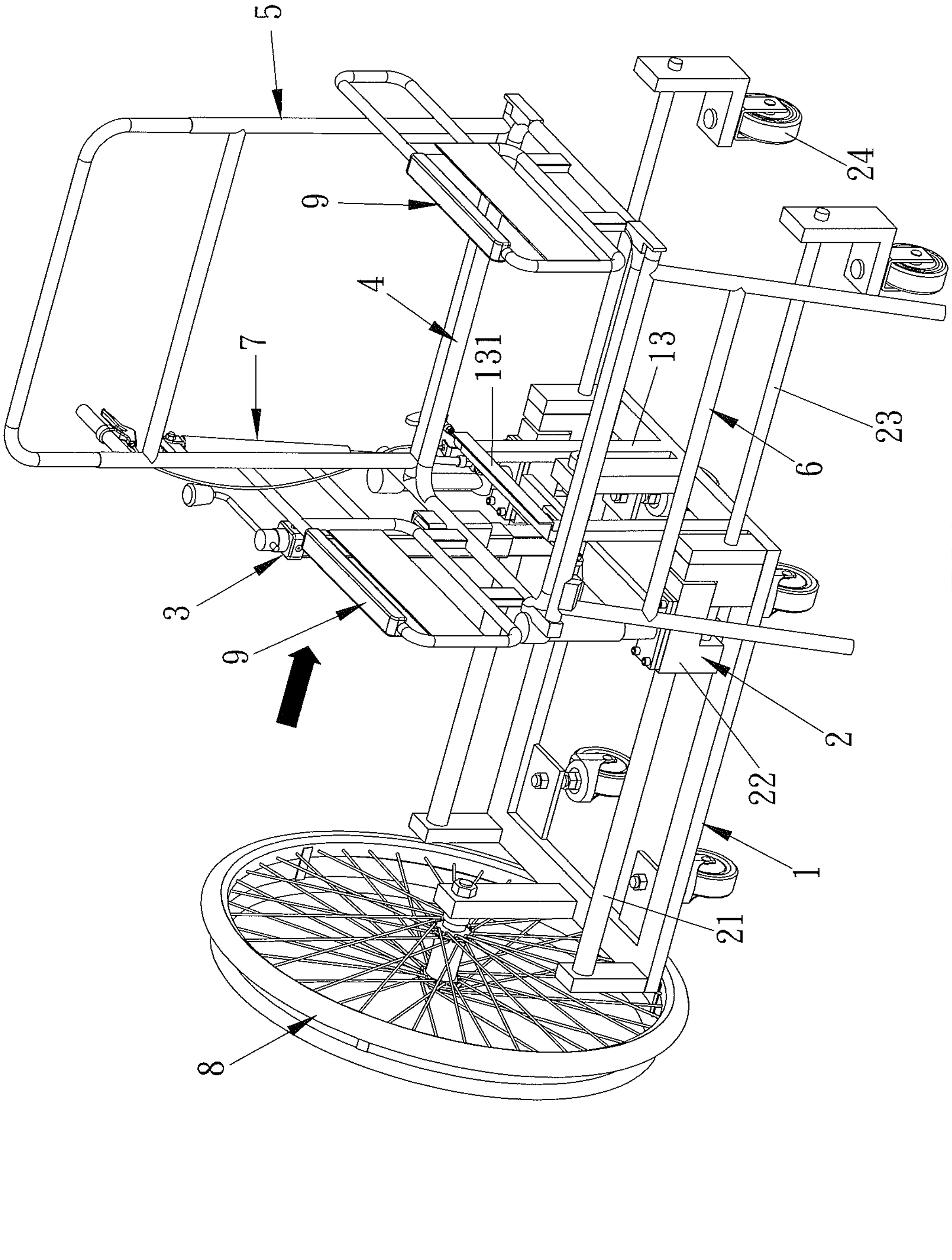
FIG. 6 is a perspective view showing the operation of the movable wheelchair structure in the wheelchair type according to the preferred embodiment of the present invention.

Referring to FIGS. 4-6, when desiring to move in the wheelchair type, the driving wheel 8 on the same side as the rod 23 which extends outward from one side of the sliding mechanism 2 is removed, and the swing bar 311 is rotated to adjust a height of the pillar 31 so that the frame 4 is actuated to move toward a suitable height and to disengage from the stop portion 131 of the supporting rack 13 of the base 1. Thus, the movable seats 22 of the sliding mechanism 2 slide on the slidable rails 21 so that the frame 4 slides toward the one side of the base 1 laterally with the back support 5 and the leg member 6, and the rods 23 movably extend out of the one side of the base 1 with the movable seats 22 and are supported by the auxiliary wheels 24.

Figure 7:
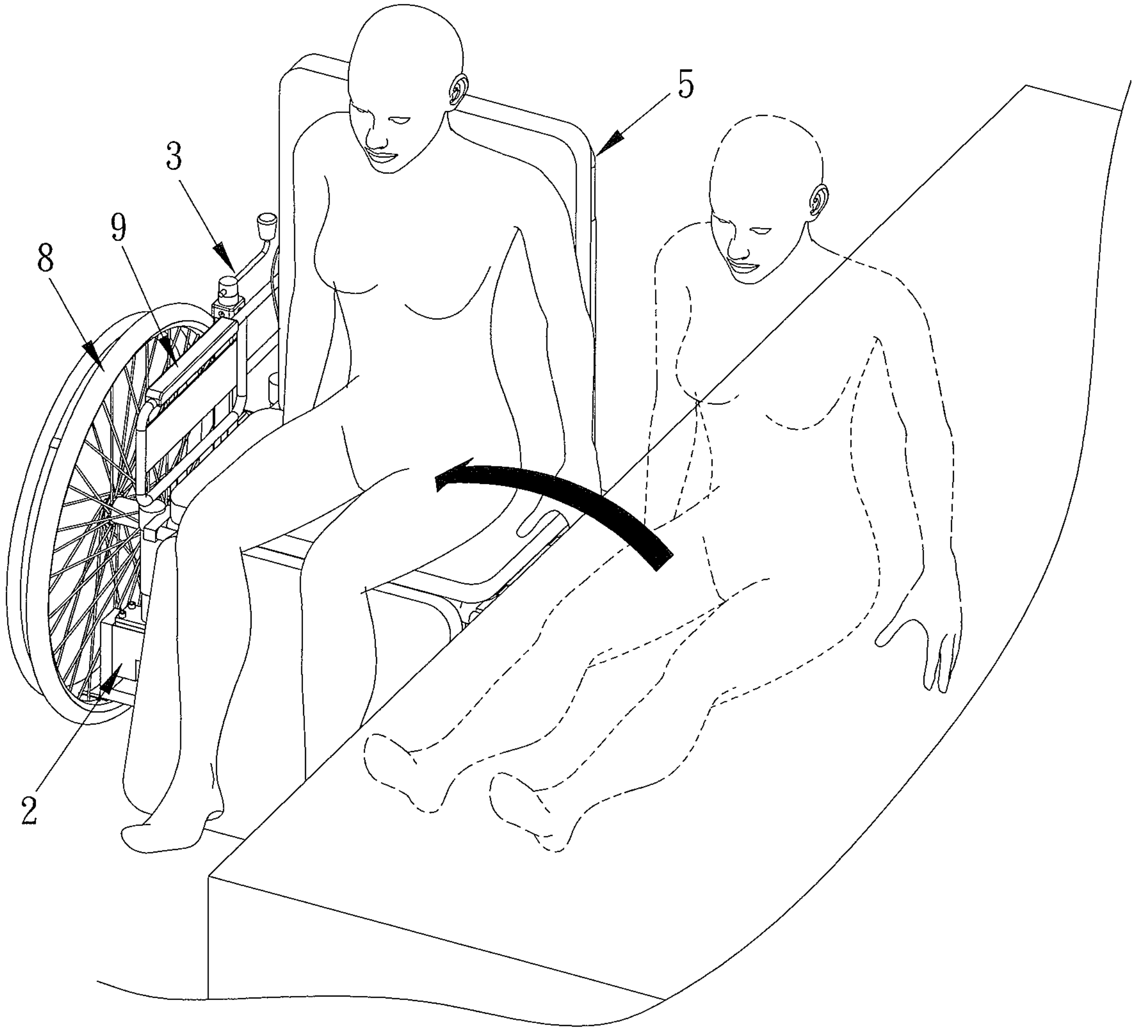
FIG. 7 is a perspective view showing a user moving from a bed to a wheelchair according to the preferred embodiment of the present invention.
Figure 8:
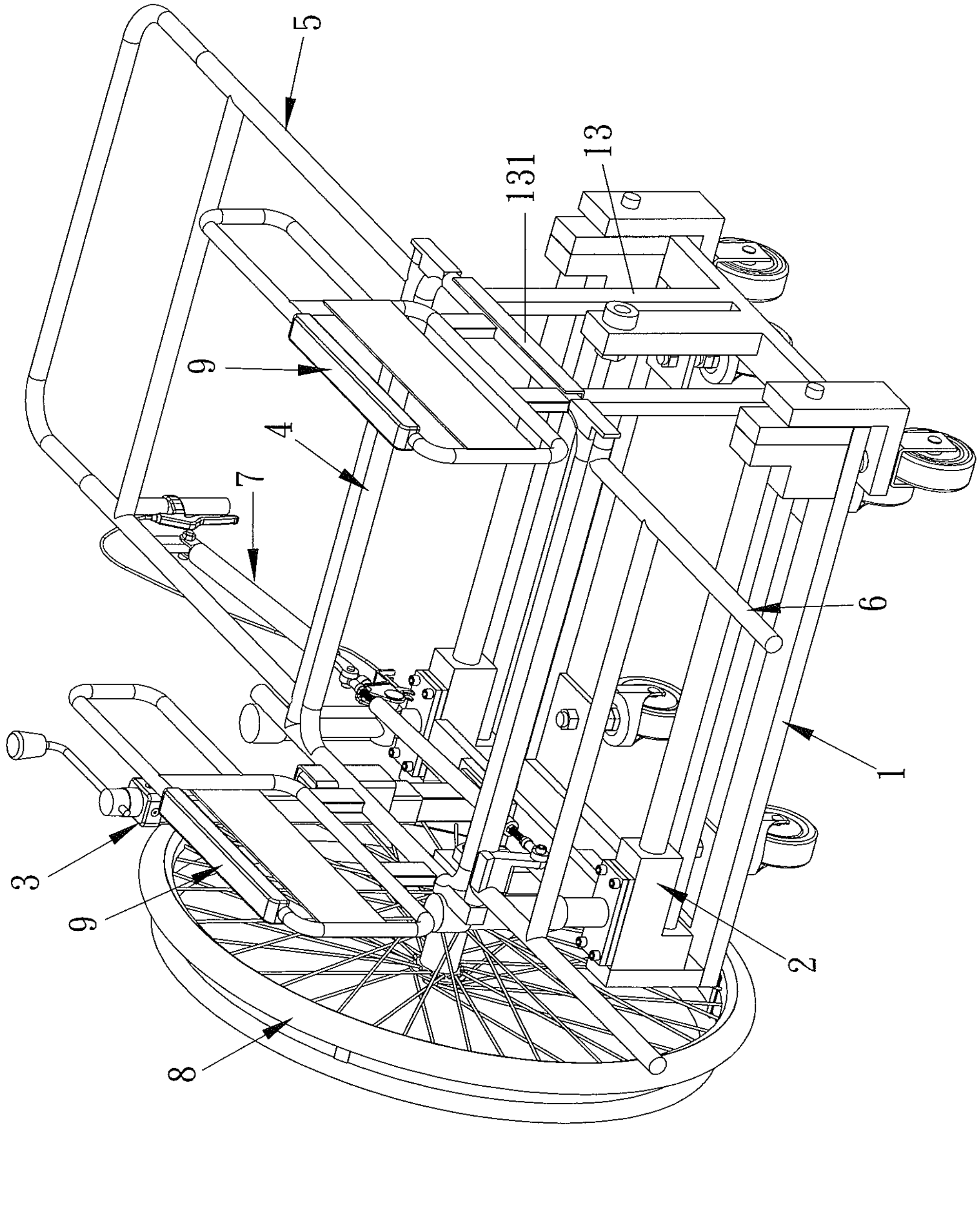
FIG. 8 is a perspective view showing the driving wheel removed from the one side of the base in a bed plane type according to the preferred embodiment of the present invention.
Figure 9:
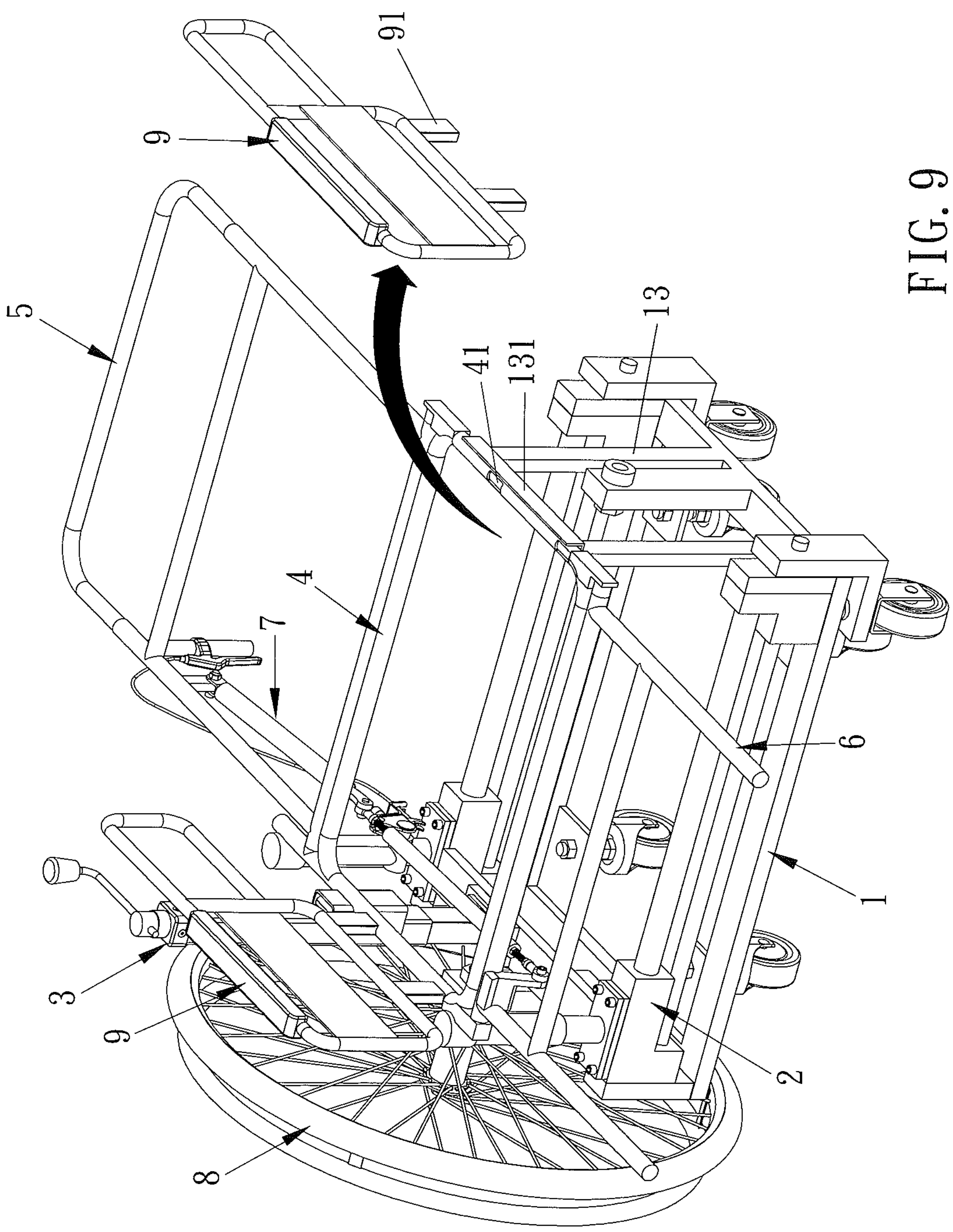
FIG. 9 is a perspective view showing an armrest removed from one side of a frame in the bed plane type according to the preferred embodiment of the present invention.
Figure 10:
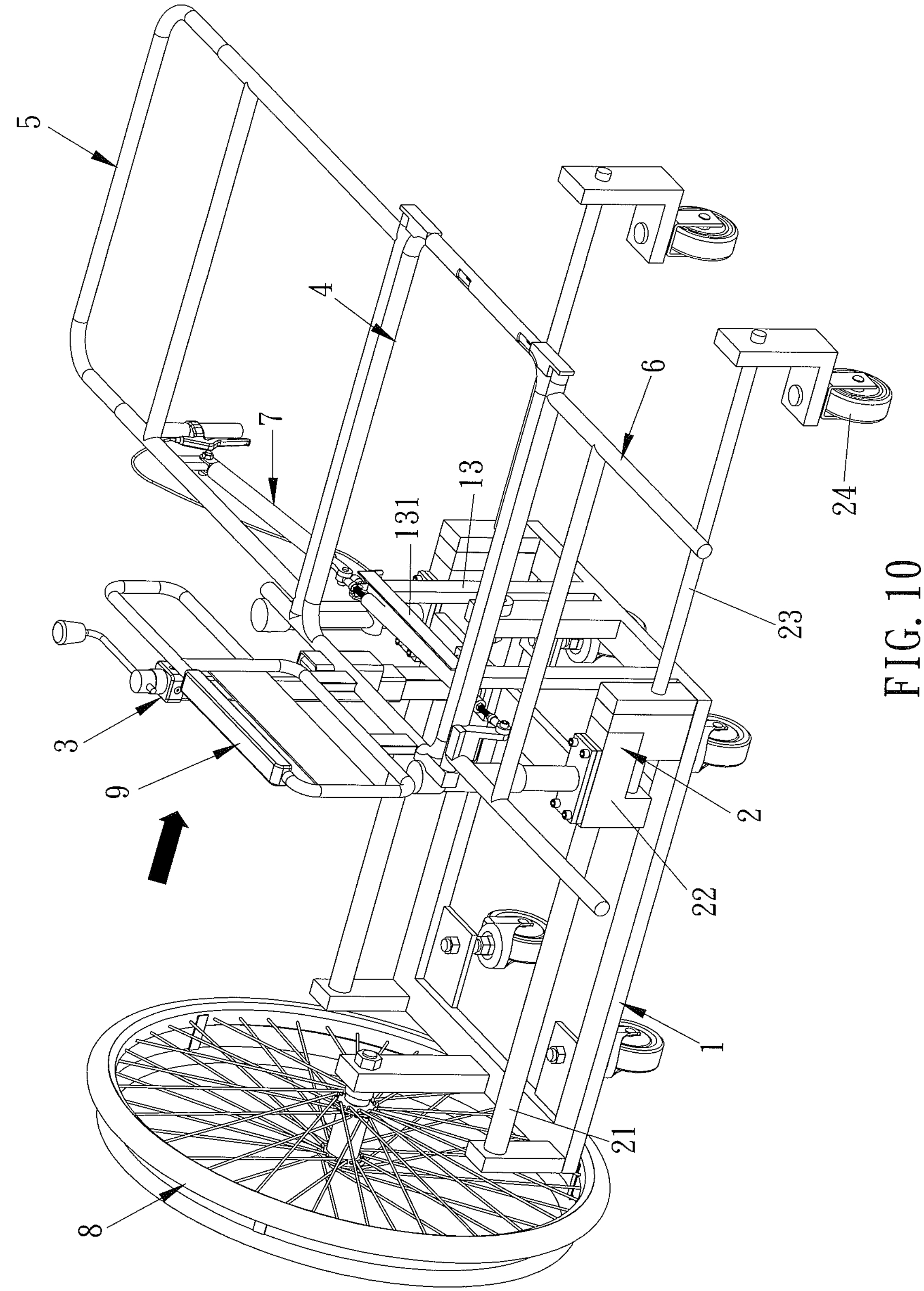
FIG. 10 is a perspective view showing the operation of the movable wheelchair structure in the bed plane type according to the preferred embodiment of the present invention.

As illustrated in FIG. 7, when the driving wheel 8 and the armrest 9 are removed from the one side of the base 1, the frame 4 which does not slide outward laterally or slides outward laterally to the one side of the base 1 is provided to move a user from a wheelchair to another position or from another position to the wheelchair.

Figure 11:
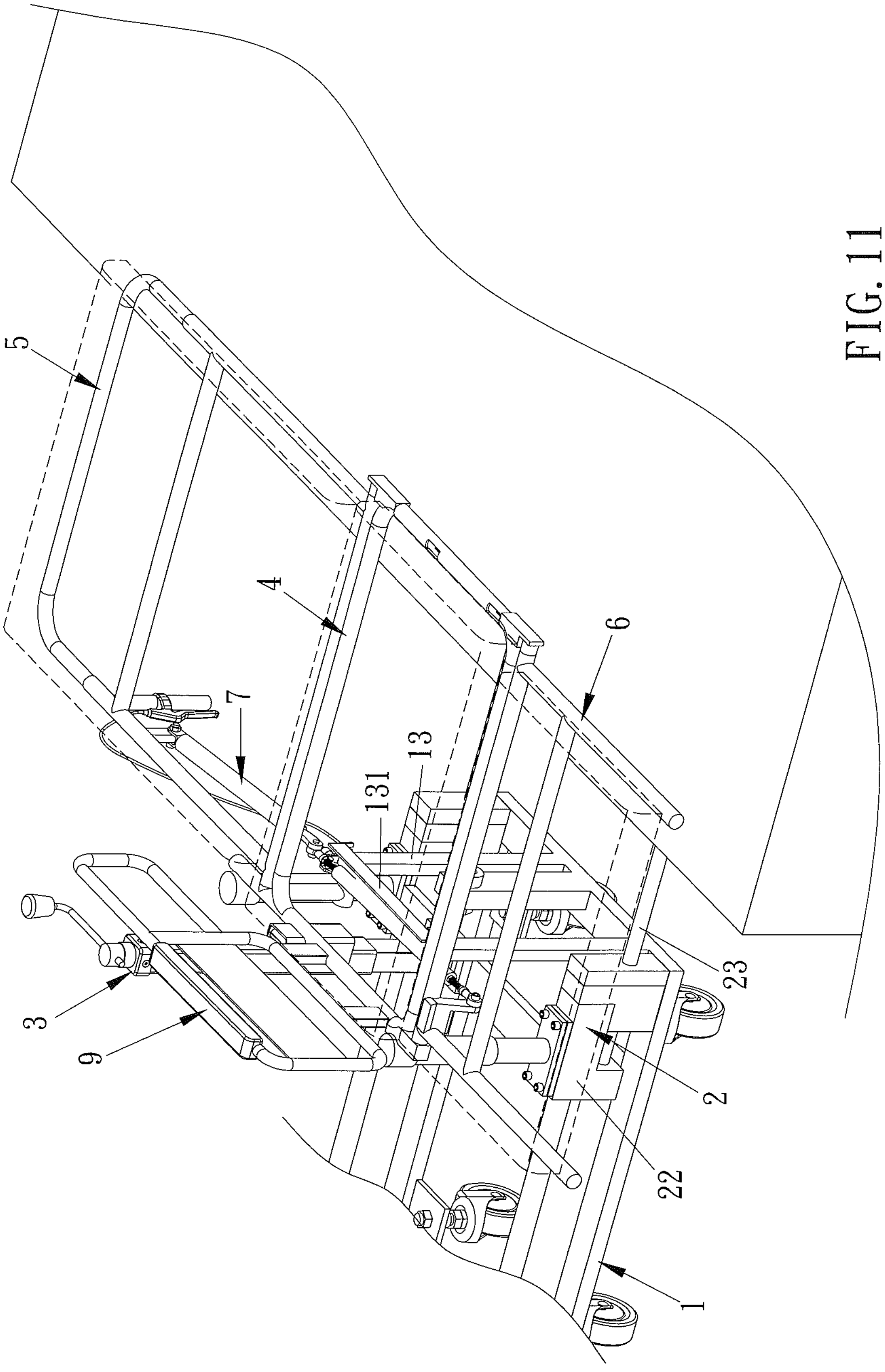
FIG. 11 is another perspective view showing the operation of the movable wheelchair structure in the bed plane type according to the preferred embodiment of the present invention.
Figure 12:
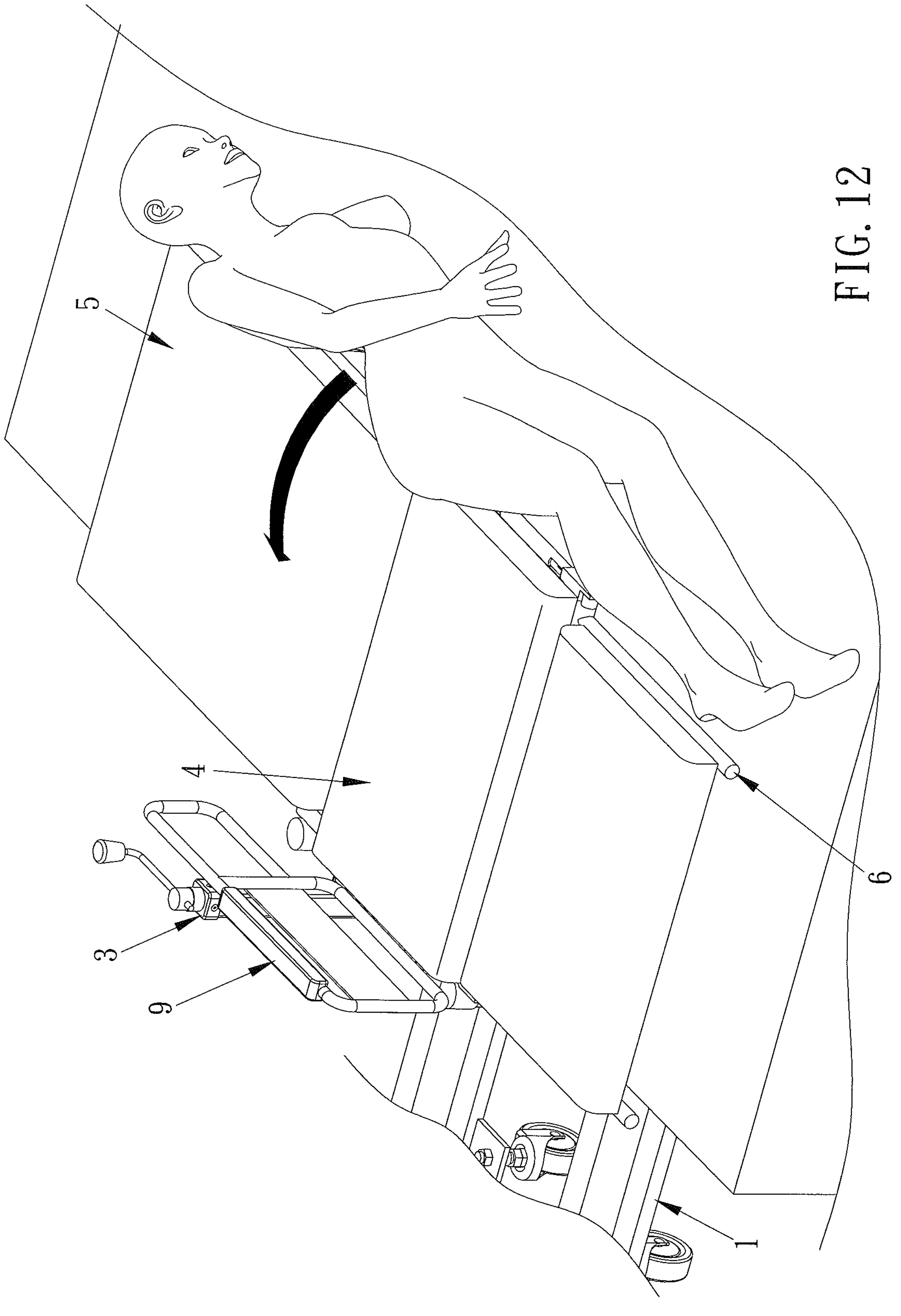
FIG. 12 is a perspective view showing the operation of the movable wheelchair structure when the user is in a laying posture according to the preferred embodiment of the present invention.
Figure 13:
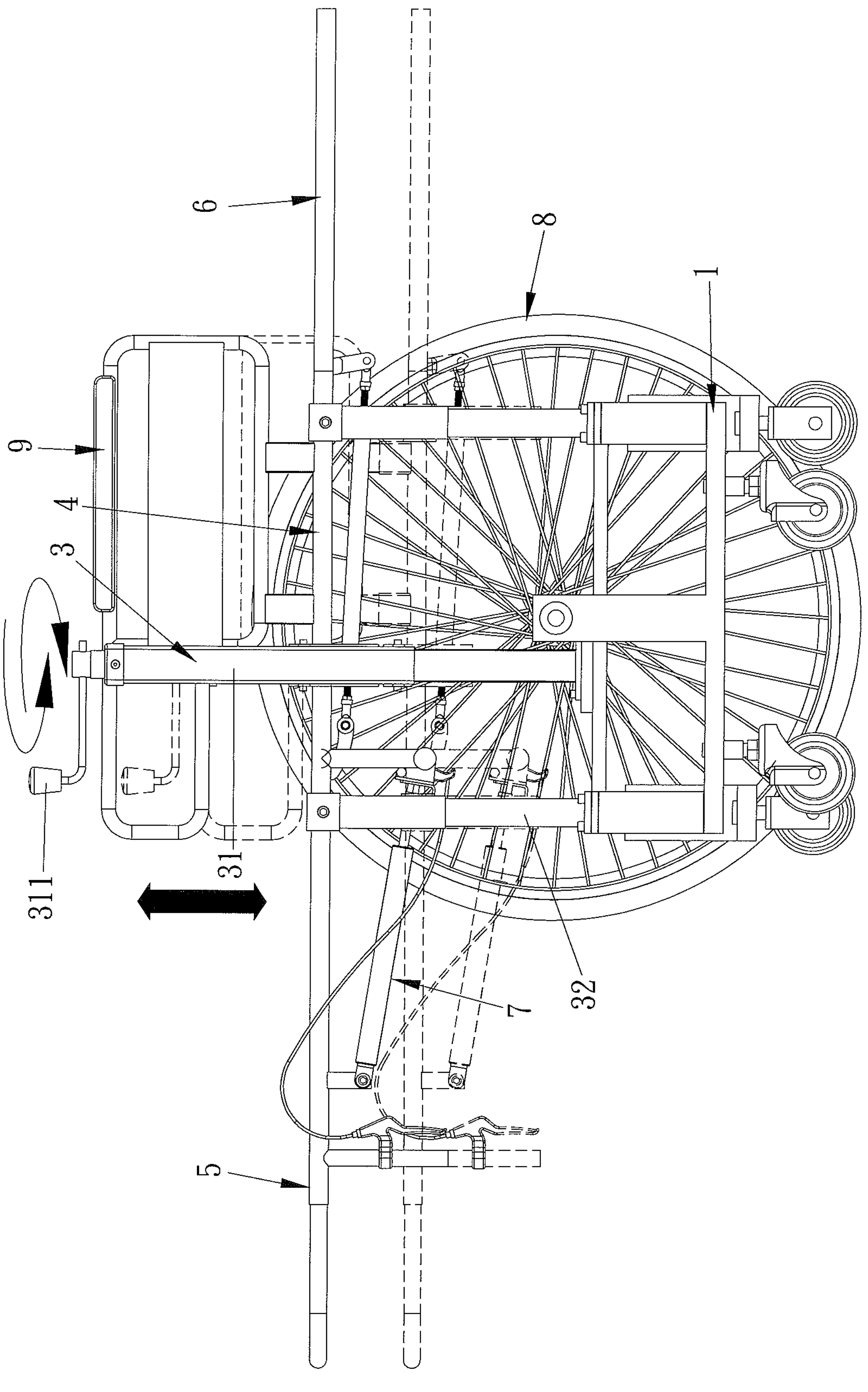
FIG. 13 is a plan view showing the operation of the movable wheelchair structure in the bed plane type according to the preferred embodiment of the present invention.

With reference to FIGS. 8-10 and 5, when desiring to move in the bed plane type, the driving wheel 8 and the armrest 9 on the same side as the rod 23 which extends outward from the one side of the sliding mechanism 2 are removed, and the swing bar 311 is rotated to adjust the height of the pillar 31 so that the frame 4 is actuated to move upward to a suitable height and to disengage from the stop portion 131 of the supporting rack 13 of the base 1. Thus the movable seats 22 of the sliding mechanism 2 slide on the slidable rails 21 so that the frame 4 slides toward the one side of the base 1 laterally with the back support 5 and the leg member 6, and the rods 23 movably extend out of the one side of the base 1 with the movable seats 22 and are supported by the auxiliary wheels 24. As shown in FIGS. 11 and 12, the back support 5, the leg member 6, and the frame 4 are provided to form a bed plane so that the user moves from the wheelchair to the bed or from the bed to the wheelchair in a laying posture. In addition, when a height of the bed is different from that of the back support 5 of the wheelchair as illustrated in FIG. 13, the swing bar 311 is rotated to adjust the height of the pillar 31, and, then, the frame 4, the back support 5, and the leg member 6 are actuated simultaneously to be moved vertically toward a desired height.

Figure 14:
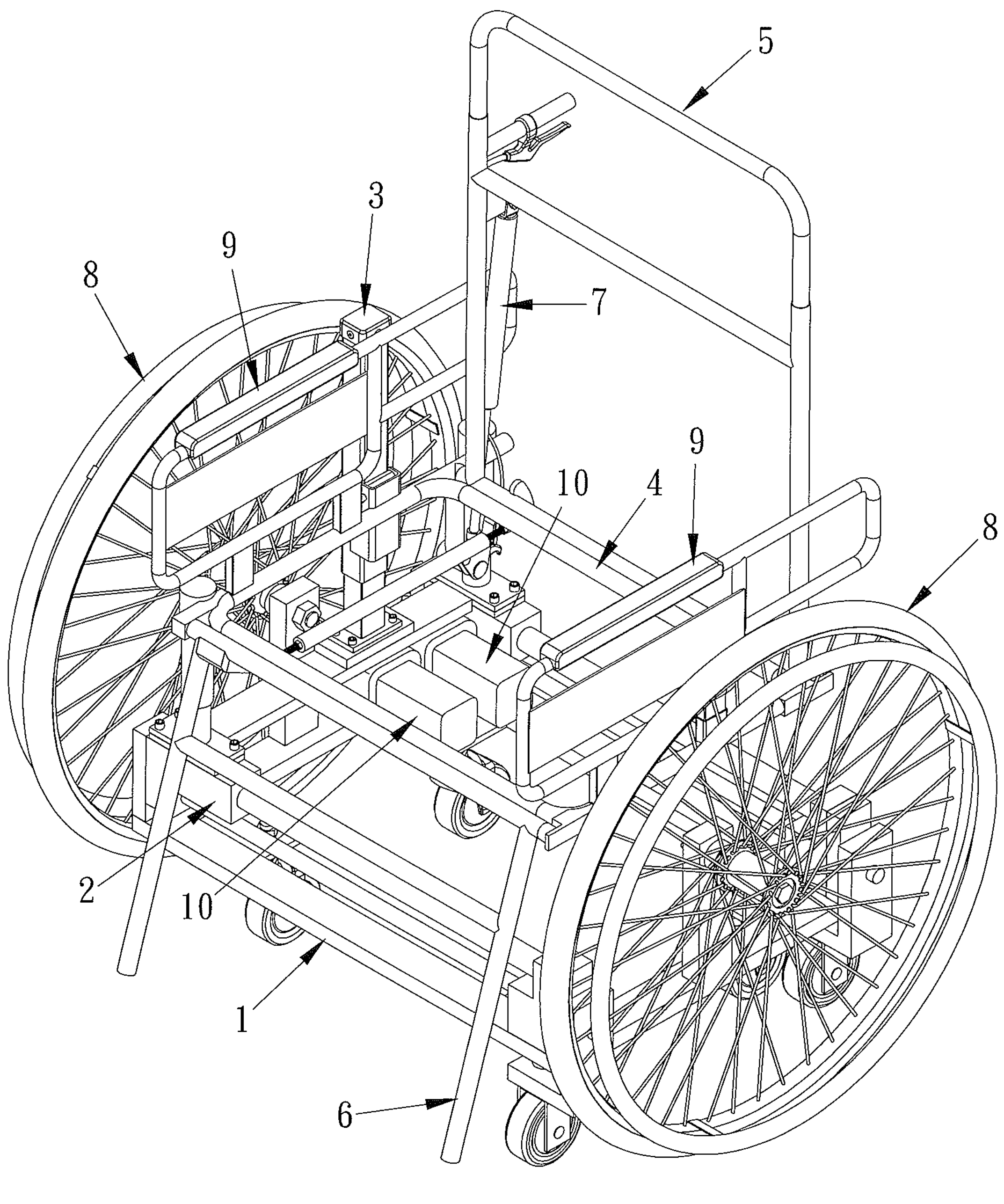
FIG. 14 is a perspective view showing the movable wheelchair structure provided with an electrical device according to the preferred embodiment of the present invention.

Referring to FIG. 14, the sliding mechanism 2 and the vertical moving mechanism 3 are provided with an electrical device 10 to be actuated by the electrical device 10.

Thereby, the movable wheelchair structure of the present invention has the following advantages:

1. The back support 5, the leg member 6, and the frame 4 are capable of being adjusted to generate the bed plane, and then the frame 4, the back support 5, and the leg member 6 move vertically and horizontally with the vertical moving mechanism 3 and the sliding mechanism 2 so that the user moves onto the bed or another position, enhancing usage at a hospital and at home.

2. The driving wheel 8 and the armrest 9 are movably removed, and the frame 4, the back support 5, and the leg member 6 are removed from the base 1 easily, thus decreasing a size and a transposition cost of the wheelchair. Also, the wheelchair is portable or stored conveniently.

While various embodiments in accordance with the present invention have been shown and described, it is clear to those skilled in the art that further embodiments may be made without departing from the scope of the present invention.

What is claimed is:

1. A movable wheelchair structure comprising:

two driving wheels;

a base including a plurality of rollers disposed on a bottom end thereof, wherein the base includes two positioning posts extending upward from two sides thereof respectively to removably rotatably connect with the two driving wheels respectively about a rotation axis;

a sliding mechanism fixed on the base and including two rods extending outward from one side of the base, with each rod including an auxiliary wheel extending outward from one end portion thereof, with each rod slideable in a direction parallel to the rotation axis;

a vertical moving mechanism fixed on the sliding mechanism;

a frame fixed on one side of the vertical moving mechanism and moving vertically and horizontally with the vertical moving mechanism and the sliding mechanism;

a back support axially coupled with a rear end of the frame; and a leg member axially connected with a front end of the frame.

2. The movable wheelchair structure as claimed in claim 1, wherein the base includes a supporting rack fixed on one side thereof, and wherein the support rack has a stop portion secured on a top end thereof.

3. The movable wheelchair structure as claimed in claim 1, wherein the sliding mechanism includes two slidable rails arranged on front and rear ends thereof individually, wherein each slidable rail includes a movable seat formed thereon, and wherein the movable seat includes the rod extending outward from one side thereof.

4. The movable wheelchair structure as claimed in claim 1, wherein the vertical moving mechanism includes a pillar to move vertically and two auxiliary telescopic tubes.

5. The movable wheelchair structure as claimed in claim 1, wherein one side of the frame is connected with the vertical moving mechanism in a retaining and fitting manner.

6. The movable wheelchair structure as claimed in claim 1, wherein the frame includes two armrests disposed on two sides thereof individually.

7. The movable wheelchair structure as claimed in claim 1 further comprising an angle adjusting mechanism to adjust a leaning angle of the back support and the leg member.

8. The movable wheelchair structure as claimed in claim 7, wherein the angle adjusting mechanism includes an expanding and retracting device, a connecting stem, and a controller, wherein the expanding and retracting device is defined between the frame and the back support, wherein the connecting stem is defined between the back support and the leg member, and wherein the controller is used to control the expanding and retracting device to move.

* * * * *